(12) United States Patent
Barceló Arroyo et al.

(10) Patent No.: US 8,289,963 B2
(45) Date of Patent: Oct. 16, 2012

(54) PROCESS AND SYSTEM FOR CALCULATING DISTANCES BETWEEN WIRELESS NODES

(75) Inventors: Francisco Barceló Arroyo, Barcelona (ES); Marc Ciurana Adell, Barcelona (ES); Israel Martín Escalona, Barcelona (ES)

(73) Assignee: Universitat Politècnica de Catalunya, Barcelona (ES)

( * ) Notice: Subject to any disclaimer, the term of this patent is extended or adjusted under 35 U.S.C. 154(b) by 306 days.

(21) Appl. No.: 12/771,162

(22) Filed: Apr. 30, 2010

(65) Prior Publication Data

US 2011/0255523 A1    Oct. 20, 2011

Related U.S. Application Data

(63) Continuation of application No. PCT/ES2010/000161, filed on Apr. 16, 2010.

(51) Int. Cl.
*H04L 12/28* (2006.01)
*H04B 1/38* (2006.01)

(52) U.S. Cl. .......................... 370/389; 455/73
(58) Field of Classification Search .................. None
See application file for complete search history.

(56) References Cited

U.S. PATENT DOCUMENTS

| 7,872,583 | B1 * | 1/2011 | Yushkov et al. | 340/572.1 |
| 2003/0046022 | A1 * | 3/2003 | Silverman | 702/150 |
| 2004/0258012 | A1 * | 12/2004 | Ishii | 370/328 |
| 2006/0025153 | A1 * | 2/2006 | Inaba | 455/456.1 |
| 2010/0081451 | A1 * | 4/2010 | Mueck et al. | 455/456.1 |
| 2010/0118895 | A1 * | 5/2010 | Radulescu | 370/503 |

* cited by examiner

*Primary Examiner* — Hassan Phillips
*Assistant Examiner* — Eunsook Choi
(74) *Attorney, Agent, or Firm* — Hess Patent Law Firm PC; Robert J. Hess

(57) ABSTRACT

Process and system for calculating distances between wireless nodes. The process includes, in order to determine the RTT between a node to be positioned and a reference node:
  providing a time-stamping software layer above the physical layer, and using it to assign and register timestamps to the inputs and outputs of data frames received and to be sent by the node to be positioned;
  processing, by means of a link software layer, the data frames received and to be sent by the latter; and
  providing a binding software layer, above said link software layer, and using it to access the timestamps registered and the data frames received and to be sent, and binding them to one another.

The system includes a wireless node to be positioned configured to implement the process proposed by the process.

18 Claims, 3 Drawing Sheets

PROCESS AND SYSTEM FOR CALCULATING DISTANCES BETWEEN WIRELESS NODES

BACKGROUND OF THE INVENTION

1. Field of the Art

The present invention relates, in a first aspect, to a process for calculating distances between wireless nodes, based on the calculation of the round trip time, or RTT, between the sending and the reception of respective data packets or frames, and more particularly to a process which comprises calculating said round trip time by means of providing and using software layers in a node to be positioned.

A second aspect of the invention relates to a system for calculating distances between wireless nodes which comprises a wireless node to be positioned configured to implement the process proposed by the first aspect.

The invention has, among other applications, those referred to mobile communications, geolocation and telematic engineering.

2. Prior State of the Art

The calculation of the time of arrival of packets transmitted or received in a node is an essential process in the positioning by means of multilateration systems. There are multiple approaches to this problem, although the proposed processes can be classified into two large groups: hardware and software solutions. The first of the groups comprises those solutions in which, to achieve measurements of times of arrival in wireless network nodes, the hardware of said nodes is modified. It is thus achieved that the measurements are taken at the precise instant in which the frames are received or transmitted by the network node. The main drawback of this type of approach for calculating the times of arrival is that, since it requires hardware modifications, it is not applicable to conventional network devices and therefore cannot be directly applied to already deployed communications systems. An example of this can found in the proposal for WLAN networks published in [1], where a process for calibrating the delay in transmitter and receiver nodes by means of RTS/CTS is performed. [2] proposes obtaining the timestamps corresponding to the receptions and transmissions of packets by means of capturing a waveform segment of the transmitted signal to filter it and compare it with a known sequence. Other proposals in this sense have chosen to suggest changes in the "firmware" of the network interfaces of the nodes to be positioned, thus reducing the hardware modifications to a minimum. Some of the most significant contributions in this sense for WLAN networks are those which can be found in [3-5].

The second of the groups of solutions for calculating the times of arrival is based on modifying the software controlling the node, using the existing hardware capabilities to calculate the timestamps. Most of these solutions are based on time-stamping the transmission of a packet towards a reference node and the subsequent reception of said packet (or another response) in the source node (RTT). To that end, they alter the link level of the protocol stack of the device, although each of them chooses different strategies.

An approach of said software solutions consists of using a network interface capable of providing time measurements made by the hardware. The advantage of this approach is that they are usually solutions using standard hardware, directly applicable to any already deployed system. However, the timestamps performed with this type of process usually do not have an acceptable accuracy for most location applications. For example, in the case of WLAN, the characteristics of the IEEE 802.11 standard [10] would make said resolution be 1 microsecond, which corresponds to 300 meters of error in terms of distance. Furthermore, IEEE 802.11 only contemplates performing timestamps in the reception of the frames and not in the transmission. A representative process of this option is the one presented in [6], which uses the node to be positioned and a monitoring node to capture RTTs by means of using the "tcpdump" command. To reduce the error derived from the system of measurements, said system chooses to take a large number of samples and refine them by means of a statistical filtering process. The authors thus achieve errors in distance of the order of 8 meters, a value which can be considered to be poor for multiple services and environments. In 2008, the same authors proposed a location system called Goodtry [7], which uses a technique similar to the one set forth in [6] but to which several new characteristics which are theoretically capable of improving the accuracy obtained are added.

It is necessary to offer an alternative software solution to those included in the approach described in the previous paragraph which allows obtaining higher accuracy in the calculation of RTTs and which, in contrast to the mentioned software solutions, does not use the network interface to obtain the time measurements, i.e., it is transparent to the network interface used and can be implemented in the actual node to be positioned, without needing to use a monitoring node.

SUMMARY OF THE INVENTION

The present invention forms said alternative software solution by means of providing a process and a system for calculating distances between wireless nodes, and it is comprised in an alternative software approach to the one described in the previous section consisting of modifying the device at interrupt level, capturing the flow of operations and altering it to capture the RTTs. This alternative software approach allows higher independency on the hardware and wireless system used, performing timestamps both in transmission and in reception and the possible use of clock signals of alternative clocks to perform said timestamps.

According to a first aspect, the present invention relates to a process for calculating distances between wireless nodes, which comprises, in a known manner:

a) sending, from a wireless node to be positioned, a request data packet or frame, to a reference wireless node, with a known position, or anchor node;

b) receiving, in said node to be positioned, a response data packet or frame, sent by said reference node after receiving said request data frame;

c) calculating the time elapsed between said sending of stage a) and said reception of stage b), or round trip time; and d) calculating the distance between both wireless nodes from said calculated elapsed time.

The response data frame generally contains information of acknowledgement that the reference node has received the request data frame, or is the same request data frame, reflected in the reference node, although the process proposed by the first aspect of the invention is applicable to any type of response data frame.

Unlike conventional proposals, the process proposed by the first aspect of the invention characteristically comprises, for the purpose of determining said round trip time in the node to be positioned:

providing, in the node to be positioned, a time-stamping software layer above the physical layer in an OSI stack, and using it to assign and register timestamps to at least part of the inputs and outputs of data frames received and to be sent by the node to be positioned;

processing, by means of a link software layer of the OSI stack of the node to be positioned, the data frames received and to be sent by the latter; and providing a binding software layer, above the link software layer, and using it to:
- access the timestamps registered by means of the time-stamping software layer,
- access the data frames to be sent, prior to their passage through the link software layer, and the data frames received, once processed by the link software layer, and
- bind (i.e. link) the corresponding timestamps with at least the request data frame to be sent in stage a) and the response data frame received in stage b).

In relation to the request data frame to be sent in stage a), the process proposed by the first aspect of the invention comprises, for one embodiment, performing the following stages sequentially:
- capturing the request data frame to be sent by means of the binding software layer;
- processing the request data frame to be sent by means of the link software layer;
- assigning and registering, by means of the time-stamping software layer, a timestamp to the output of the request data frame to be sent once processed by the link software layer; and
- accessing, by means of the binding software layer, the timestamp registered and assigned by the time-stamping software layer, and binding it (i.e. linking it) to the request data frame previously captured by the binding software layer.

In relation to the response data frame received in stage b), the process comprises, according to one embodiment, performing the following stages sequentially:
- assigning and registering, by means of the time-stamping software layer, a timestamp to the input of the response data frame received;
- processing, by means of the link software layer, the response data frame received; and
- using the binding software layer to capture the response data frame received, once processed by the link software layer, to access the timestamp registered and assigned by the time-stamping software layer, and to bind them (i.e. to link them) to one another.

For the purpose of increasing the accuracy of the assigned timestamps, the process proposed by the first aspect of the invention comprises, for a preferred embodiment, using a clock of the node to be positioned independent of the one used by the link software layer and with higher accuracy in order to obtain said timestamps.

For another less preferred embodiment, the process comprises using the same clock of the node to be positioned used by the link software layer in order to obtain the timestamps.

For a preferred embodiment the time-stamping software layer is arranged, in the OSI stack, between the physical layer and the link software layer.

In relation to the location of the binding software layer, for one embodiment, it is arranged, in the OSI stack, at the same level as a protocol stack software layer.

The process generally comprises carrying out the mentioned processing of data frames by means of a network interface driver contained in the link software layer According to one embodiment, the assignment of timestamps to inputs and outputs of data frames described above comprises associating a timestamp with each hardware interrupt, representative of a respective input or output of data, related to the network interface of the node to be positioned.

The process proposed by the first aspect of the invention comprises, for one embodiment, performing a plurality of stages a) and b), and a stage c) which comprises calculating the time elapsed between the sending of each stage a) and the reception of each stage b), to obtain a plurality of round trip times.

After said stage c) of obtaining a plurality of RTTs, the process comprises performing, in the node to be positioned, according to one embodiment, a subsequent stage of filtering and storing the round trip times.

According to an embodiment of the process proposed by the first aspect of the invention, stage d) comprises filtering and calculating the distance between both wireless nodes from a subset of the round trip times stored in the node to be positioned.

For another embodiment, the process comprises performing stages a) to d) for calculating the distance between the node to be positioned with respect to a plurality of reference nodes, and supplying the distance values calculated in stage d) to a user application capable of executing a multilateration algorithm.

A second aspect of the invention relates to a system for calculating distances between wireless nodes which comprises a wireless node to be positioned configured to implement the process proposed by the first aspect.

BRIEF DESCRIPTION OF THE DRAWINGS

The previous and other advantages will be more fully understood from the following detailed description of several embodiments with reference to the attached drawings, which must be taken in an illustrative and non-limiting manner, in which.

DETAILED DESCRIPTION OF SEVERAL EMBODIMENTS

Figure 1:
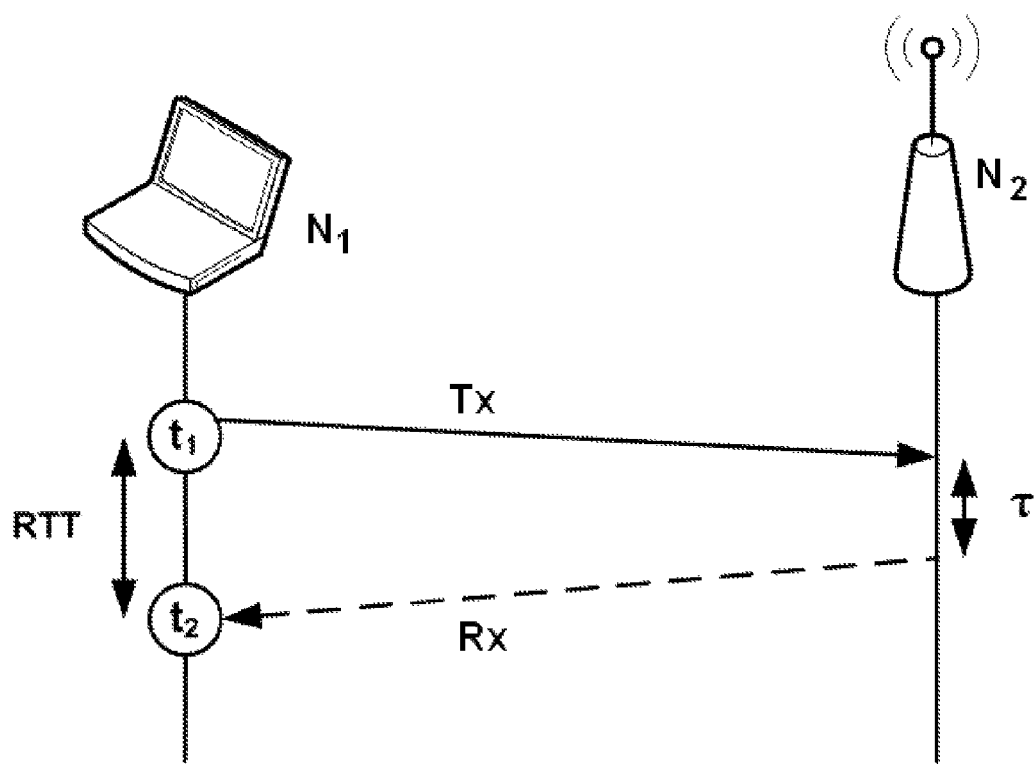
FIG. 1 is a schematic depiction including the wireless node to be positioned of the system proposed by the second aspect of the invention, the reference node, and respective data frames sent and received at determined times, according to the process proposed by the first aspect of the invention.

FIG. 1 shows the node to be positioned, referenced as N1, and the reference node or N2, with a known position. As has been indicated above, the distance between the nodes N1 and N2 is calculated from the propagation time of a signal, estimating to that end the time elapsing between the sending of said signal from the node to be positioned and the reception in the reference node and the response generated from the anchor to the node to be positioned [8]. This time is referred to as RTT and allows calculating the distance according to equation (1).

$$d = f(\text{RTT}). \tag{1}$$

Although it is not the only one, an expression commonly used to implement equation (1) is, $$d = \frac{RTT}{2}c, \quad (2)$$

where c represents the rate of propagation of the signal used to calculate the RTT (normally the speed of light).

An example of how the RTT is calculated is shown in FIG. 1. The process starts with a node to be positioned N1 which emits a message or data frame Tx towards the reference node N2. This sending is time-stamped in the node to be positioned (t1 in FIG. 1). Upon receiving the message Tx, the reference node N2 replies, immediately or after a time τ known by the two nodes N1, N2, with a response message Rx, such as an acknowledge message ACK, indicating the correct reception of the sent message. The reception instant of Rx in the node to be positioned N1 is also stamped ($t_2$ in FIG. 1), the RTT being obtained as the difference between the two timestamps ($t_2-t_1$ in FIG. 1).

As has been indicated above, the process proposed by the first aspect of the invention is based on calculating the RTT according to the described process, i.e., performing stages a) to d), although it has been designed taking into account a series of premises that it must comply with and in fact does comply with:

1. The solution must be a purely software solution, i.e., it must not involve the development of specific hardware for capturing the propagation times. This premise therefore affects the manner in which the timestamps are performed.
2. It must be independent of the hardware, i.e., operating with different types of network interfaces.
3. It must be applicable to any operating system controlling the hardware of the node to be positioned.

Figure 2:
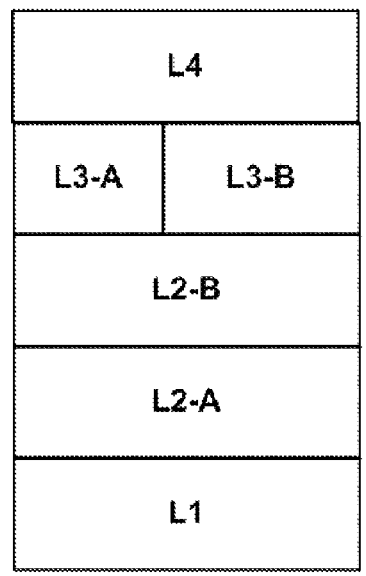
FIG. 2 is a schematic depiction of the OSI stack of the node to be positioned, modified according to the process proposed by the first aspect of the invention, for one embodiment.

To comply with the previous premises, as has been described above, the inclusion of two new layers in the OSI stack of the node to be positioned N1, as indicated in FIG. 2, is proposed. The purpose of the first of the layers, or layer L2-A, referred to above as time-stamping software layer, is to perform the timestamps. Said layer L2-A is intercalated between the physical layer L1 and the link software layer or level L2-B (where the presence of the driver of the network interface used in the node to be positioned N1 is presumed) and, according to the proposed process, will save a timestamp for each data packet circulating through the OSI stack, whether in a ascending manner (packets received) or in a descending manner (packets to be transmitted). The layer L2-A will thus save a list with the time information of all the packets with destination or source in the node to be positioned N1.

Secondly, a second new layer L3-B, referred to above as binding software layer, is introduced on the link layer or level L2-B, which will observe all the traffic managed by the OSI stack. The objective of said layer L3-B is to capture all the traffic which circulates (with regard to incoming traffic) or which will circulate (with regard to outgoing traffic) through the network interface and bind thereto the timestamp corresponding to it from those performed in the layer L2-A. The traffic will be captured by means of one of the conventional APIs, such as the one provided by [9].

Continuing with the description of FIG. 2, the layer L3-A illustrated thereon contains a conventional protocol stack, and the one indicated as L4 is an application layer.

Figure 3:
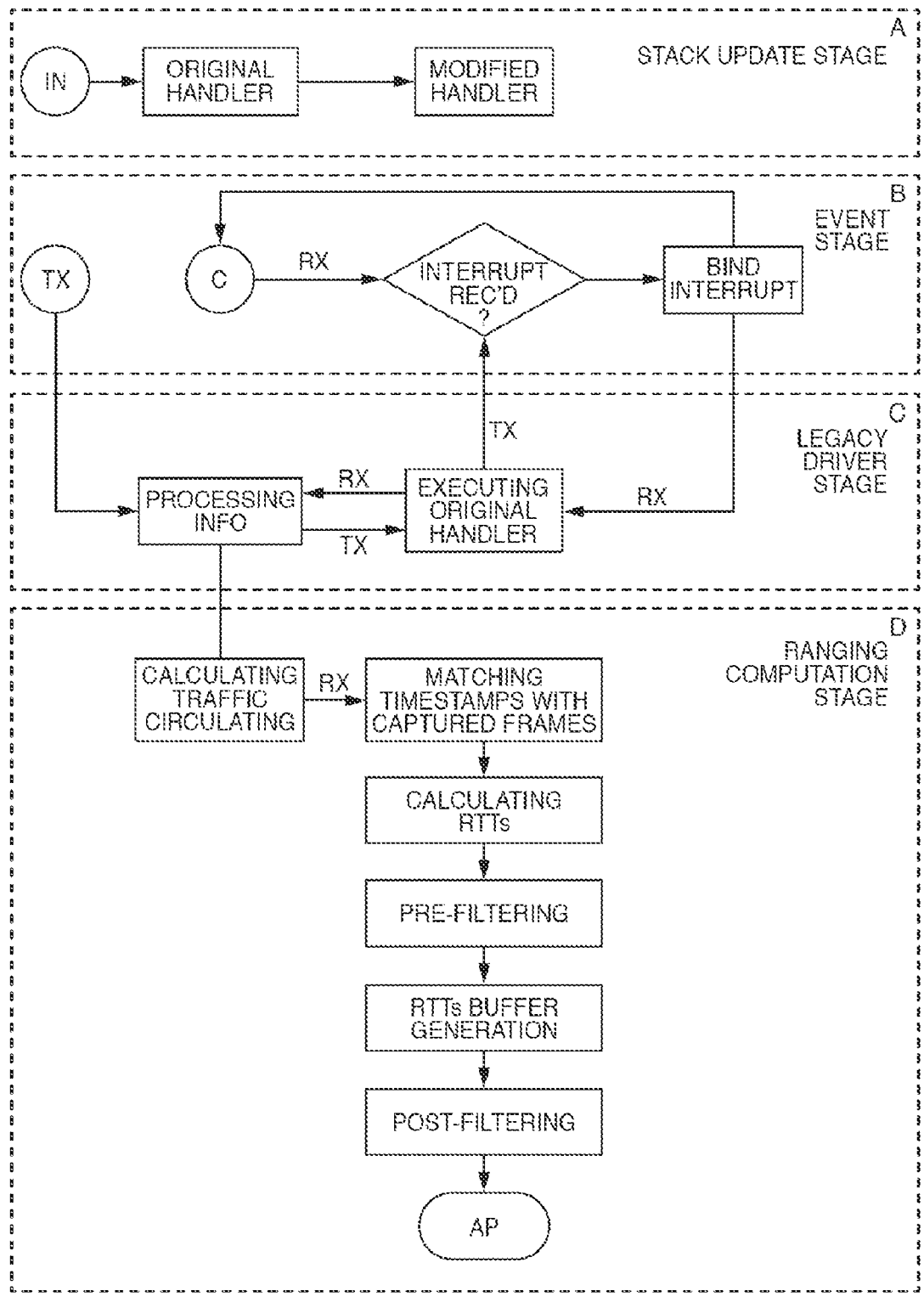
FIG. 3 is a flow chart including the different stages carried out according to the process proposed by the first aspect of the invention, for one embodiment.

FIG. 3 shows in detail the process proposed by the first aspect of the invention, for one embodiment, for estimating the distance between the node to be positioned N1 and reference node N2, using the new OSI stack described above and illustrated in FIG. 2. In the same way as in FIG. 2, in FIG. 3 Tx and Rx refer to the message sent by the node to be positioned N1 towards the reference node N2 and to its response, respectively, through channel C. The diagram illustrated by FIG. 3 depicts, by means of blocks or boxes, stages or steps connected to one another by arrow lines depicting the time flow or sequence followed to perform the different steps. Said arrow lines do not intend to depict the flow of information between the different blocks. In other words, the information obtained, for example, in (4), is available in (8) both for the frame corresponding to the sent message Tx and to the frame of the response Rx, although blocks (4) and (8) are not illustrated connected to one another.

As indicated in FIG. 3, the process can be divided into four main stages, referenced as A, B, C and D, and which are described below.

A. Stack update stage. In this stage, the system of the node N1 is updated to include in the conventional OSI stack the two layers mentioned above, i.e., L2-A and L3-B. It will only be carried out once, upon starting the process, indicated by the reference In, and involves the following steps:
  (1) The structure saving the information of the interrupt service routines, or handler, will be explored. In said structure, the memory address of the routine which will be invoked every time there is a hardware interrupt related to the network interface used in the process for calculating the distance (and therefore for positioning) will be consulted. Finally, said memory address will be saved as datum (original handler).
  (2) A new interrupt service routine will be set up for the interface involved in the process for positioning (modified handler).

B. Event stage. In this stage, the reception of an event related to the transmission (Tx) or the reception (Rx) of a data block, through the channel C, is awaited. The following actions are performed in this stage:
  (3) Any event will be accompanied by the execution of a hardware interrupt related to the network interface involved in the process for measuring the distance between nodes. At this point, the occurrence of one of said interrupts is awaited in a passive manner.
  (4) Once the interrupt is received in (3), the new routine or modified handler is invoked, which in this step (4) will bind the interrupt with a timestamp, using to that end any clock from among those available in the system (for example, the clock controlling the network interface, the clock controlling the entire node, etc.). After that, for the case of Tx, the message will be sent towards the channel C. In the case of Rx, step (5) will be performed.

C. Legacy driver stage. In this stage, all the tasks related to the network interface driver will be carried out. This operation is transparent to the process and involves all the actions which would conventionally be performed for the interrupt service in the event that modifications had not been performed in the protocol stack of the interface. Thus, this stage involves the following steps:
  (5) Executing the original handler, after step (4) for Rx and after step (6) for Tx.
  (6) Processing the information according to the protocol stack prior to the modifications performed in the stack update stage. It is executed after step (5) for Rx and upon starting the sending Tx.

D. Ranging computation stage. The task of calculating the distance between the two nodes and feeding data to user applications, the objective of which is to calculate the location of the node to be positioned, corresponds to this stage. To that end, the following steps will be performed:

(7) In this step the traffic circulating through the network interface is calculated. Thus, the information considered to be relevant of each of the frames which circulate or will circulate through the network interface driver is saved.

(8) Matching, after the execution of the original handler, of the timestamps with the captured frames. For each captured frame the list of timestamps is consulted and the stamp corresponding to it is assigned thereto. For the embodiment illustrated by FIG. 3, said matching is carried out for both frames Tx and Rx simultaneously, once the one corresponding to the response Rx has been captured in (7). This is why only Rx has been indicated in the arrow line joining (7) with (8).

(9) Calculation of the RTTs from the timestamps.

(10) Pre-filtering. In this step, those RTT measurements considered to be aberrant are eliminated. The aberrant measurements are mainly due to errors introduced by the system of measurements and the radio channel and must be extracted in order to be able to reach an RTT value suited to the actual distance separating the two network nodes.

(11) Generation of the RTTs buffer. Once the samples have been filtered, such samples are gradually added, in a queue, in a buffer, which will allow block reading the data.

(12) Post-filtering. This step is executed every time a user application requests the estimation of the distance between the node to be positioned N1 and a reference node N2. In this step, a data block of the buffer will be read. This data block will be statistically processed for the purpose of refining the variability thereof and obtaining a stable RTT value with which to calculate the distance, using to that end any implementation of Equation (1), such as that indicated in Equation (2). Once the distance has been obtained, it will be provided to the requesting user application Ap, which will calculate the position of the node, together with other distance measurements.

Figure 4:
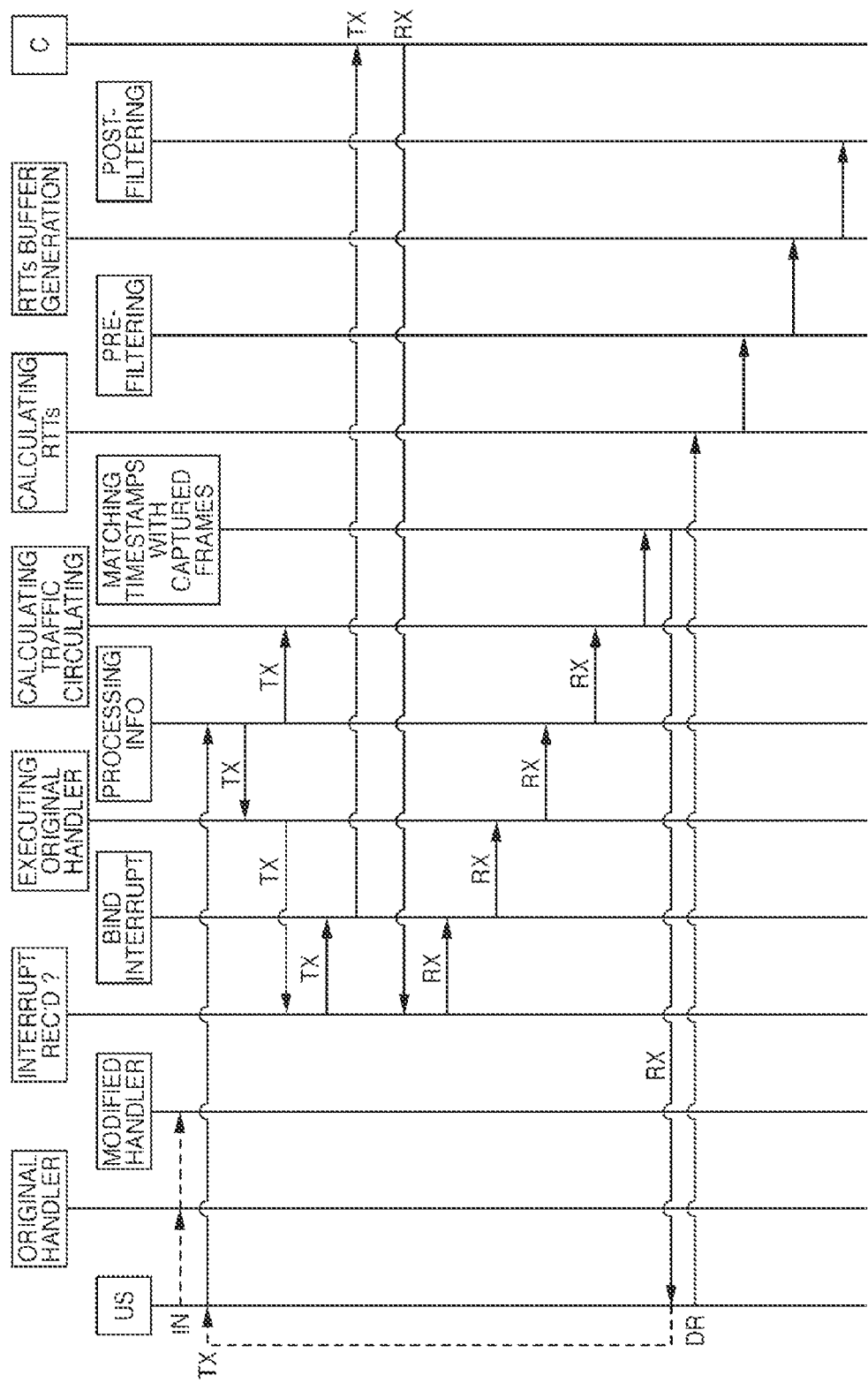
FIG. 4 is a sequence diagram of the flow followed for the process proposed by the first aspect of the invention, according to one embodiment.

FIG. 4 shows the sequence diagram of the flow followed for the process described above with reference to FIG. 3, where Us refers to the user, C to the channel, In to the initialization and DR to the distance reading. Most of the illustrated blocks correspond to the same ones illustrated in FIG. 3, therefore they conserve the same references. As can be seen, the flow starts from an initialization In, consisting of the aforementioned stack update stage. Thereafter, it waits for an application, normally under the control of the user Us, to decide to emit a data block Tx towards the communications channel C. When this occurs, the dispatch circulates through the protocols of the protocol stack of the operating system housed by the system, until reaching the link level. At this point, the frame to be sent is registered by the system and a hardware interrupt informing the network interface of the wish to transmit a frame is generated. When the hardware interrupt is received, a timestamp for the sent frame ($t_1$) is stored and the original handler, which is in charge of definitively transmitting the frame, is executed. Then the relevant response is awaited. When the response Rx is received, a new hardware interrupt is generated and a new timestamp for the received frame ($t_2$) is stored. Then the original handler is executed, which handler will end up, if necessary, delivering the frame to the remaining protocols of the conventional protocol stack. Furthermore, the frame will be captured and registered by the system, in the same way as was done for the transmitted frame. Then, the time t1 and t2 will be linked with the frames which have generated them and the corresponding RTT will be calculated. At this point, the process will be repeated all the times necessary to collect sufficient RTTs. Once sufficient information is available, the remaining actions of the ranging computation stage (i.e., from (9) onwards), i.e., the distance reading DR, will be carried out, the objective of which will be to deliver distance values to the user application with which the final position of the node will be calculated.

A person skilled in the art could introduce changes and modifications in the embodiments described without departing from the scope of the invention as it is defined in the attached claims.

REFERENCES

[1] H. Forstrom T. Dempsey D. D. McCrady, L. Doyle and M. Martorana. "Mobile ranging using low-accuracy clocks". IEEE Transactions on Microwave Theory and Techniques, 48(6):951-958, 2000.

[2] S. A. Golden and S. S. Bateman. "Sensor Measurements for Wi-Fi Location with Emphasis on Time-of-Arrival Ranging". IEEE Transactions on Mobile Computing, 6(10):1185-1198, 2007.

[3] M. Klepal S. Basuki and D. Pesch. "Time of Flight Ranging using Off-the-self IEEE802.11 WiFi Tags". In Proceedings of International Conference on Positioning and Context-Awareness (POCA), 2009.

[4] S. Mazuelas R. M. Lorenzo J. Blas J. Prieto, A. Bahillo and P. Fernández. "Adding indoor location capabilities to an IEEE 802.11 WLAN using real-time RTT measurements". In Proceedings of IEEE Wireless Telecommunications Symposium, 2009.

[5] M. Ciurana, F. Barcelo-Arroyo, and F. Izquierdo. "A ranging process with IEEE 802.11 data frames for indoor localizations". In Proceedings of IEEE Wireless Communications and Networking Conference, pages 2094-2098, 2007.

[6] A. Günther and C. Hoene. "Measuring Round Trip Times to Determine the Distance Between WLAN Nodes". Lecture Notes in Computer Science, Networking, pages 768-779, 2005.

[7] C. Hoene and J. Willmann. "Four-way TOA and Software-Based Trilateration of IEEE 802.11 Devices". In Proceedings of IEEE International Symposium on Personal, Indoor and Mobile Radio Communications (PIMRC), 2008.

[8] Nathan Edward Tenny and Farrokh Khatibi. Apparatus and process for determining WLAN Access point position. Patent published on 4 Jan. 2007. US20070002813.

[9] LibPCAP, http://www.tcpdump.org.

[10] IEEE Standard 802.11-1999, Part 11: Wireless LAN Medium Access Control (MAC) and Physical Layer (PHY) Specifications, IEEE, 1999.

What is claimed is:

1. A process for calculating distances between wireless nodes, comprising: a) sending, from a wireless node to be positioned, a request data packet or frame, to a reference wireless node, with a known position; b) receiving, in said node to be positioned, a response data packet or frame, sent by said reference node after receiving said request data frame; c) calculating the time elapsed between said sending of stage a) and said reception of stage b), or round trip time; and d) calculating the distance between both wireless nodes from said calculated elapsed time, wherein the process further comprises, for the purpose of determining said round trip time in the node to be positioned: providing, in said node to be positioned, a time-stamping software layer above the physical layer, in an OSI stack, and using it to assign and register timestamps to at least part of the inputs and outputs of data frames received and to be sent by said node to be positioned; processing, by means of a link software layer of said OSI stack of the node to be positioned, the data frames received and to be sent by the latter; and providing a binding software layer, above said link software layer, and using it to: access the timestamps registered by means of said time-stamping software layer, access the data frames to be sent, prior to their passage through the link software layer, and the data frames received, once processed by the link software layer, and bind the corresponding timestamps with at least the request data frame to be sent in stage a) and the response data frame received in stage b).

2. The process according to claim 1, wherein, in relation to the request data frame to be sent in stage a), it comprises performing the following stages sequentially: capturing the request data frame to be sent by means of the binding software layer; processing the request data frame to be sent by means of the link software layer; assigning and registering, by means of the time-stamping software layer, a timestamp to the output of the request data frame to be sent once processed by the link software layer; and accessing, by means of the binding software layer, the timestamp registered and assigned by the time-stamping software layer, and binding it to the request data frame previously captured by the binding software layer.

3. The process according to claim 2, wherein, in relation to the response data frame received in stage b), it comprises performing the following stages sequentially: assigning and registering, by means of the time-stamping software layer, a timestamp to the input of the response data frame received; processing, by means of the link software layer, the response data frame received; and using the binding software layer to capture the response data frame received, once processed by the link software layer, to access the timestamp registered and assigned by the time-stamping software layer, and to bind them to one another.

4. The process according to claim 1, comprising using a clock of the node to be positioned independent of the one used by the link software layer and with higher accuracy in order to obtain said timestamps.

5. The process according to claim 1, comprising using the same clock of the node to be positioned used by the link software layer in order to obtain said timestamps.

6. The process according to claim 1, wherein said time-stamping software layer is arranged, in the OSI stack, between the physical layer and said link software layer.

7. The process according to claim 1, wherein said binding software layer is arranged, in the OSI stack, at the same level as a protocol stack software layer.

8. The process according to claim 1, comprising carrying out said processing of data frames by means of a network interface driver contained in said link software layer.

9. The process according to claim 1, wherein said response data frame contains information of acknowledgement that the reference node has received the request data frame.

10. The process according to claim 1, wherein said response data frame is the same request data frame, reflected in said reference node.

11. The process according to claim 1, wherein said assignment of timestamps to inputs and outputs of data frames comprises associating a timestamp with each hardware interrupt, representative of a respective input or output of data, related to the network interface of the node to be positioned.

12. The process according to claim 1, comprising performing a plurality of said stages a) and b), and in that said stage c) comprises calculating the time elapsed between the sending of each stage a) and the reception of each stage b), to obtain a plurality of round trip times.

13. The process according to claim 12, comprising, after said stage c), performing, in the node to be positioned, a subsequent stage of filtering and storing the round trip times.

14. The process according to claim 13, wherein said stage d) comprises filtering and calculating the distance between both wireless nodes from a subset of the round trip times stored in the node to be positioned.

15. The process according to claim 1, comprising performing said stages a) to d) to calculate the distance between said node to be positioned with respect to a plurality of reference nodes.

16. The process according to claim 15, comprising supplying the distance values calculated in stage d) to a user application capable of executing a multilateration algorithm.

17. A system for calculating distances between wireless nodes, comprising a wireless node to be positioned and configured to implement stage a) means for sending, from the wireless node to be positioned, a request data packet or frame, to a reference wireless node, with a known position; stage b) means for receiving, in said wireless node to be positioned, a response data packet or frame, sent by said reference wireless node after receiving said request data frame; c) means for calculating the time elapsed between said sending of stage a) and said reception of stage b), or round trip time; and d) means for calculating distance between both wireless nodes from said calculated elapsed time, means for determining said round trip time in the wireless node to be positioned that includes means for providing, in said wireless node to be positioned, a time-stamping software layer above a physical layer, in an OSI stack, and means for assigning and registering with said time-stamping layer timestamps to at least part of the inputs and outputs of data frames received and to be sent by said wireless node to be positioned; means for processing, by means of a link software layer of said OSI stack of the node to be positioned, the data frames received and to be sent by the latter; and providing a binding software layer, above said link software layer, and means for accessing with said binding software layer the timestamps registered by means of said time-stamping software layer, means for accessing the data frames to be sent, prior to their passage through the link software layer, and the data frames received, once processed by the link software layer, and bind the corresponding timestamps with at least the request data frame to be sent in stage a) and the response data frame received in stage b).

18. A process for calculating distances between wireless nodes, comprising: stage a) sending, from a wireless node to be positioned, a request data packet or frame, to a reference wireless node, with a known position; stage b) receiving, in said wireless node to be positioned, a response data packet or frame, sent by said reference node after receiving said request data frame; c) calculating the time elapsed between said sending of stage a) and said reception of stage b), or round trip time; and d) calculating distance between both wireless nodes from said calculated elapsed time, wherein the process further comprises, for the purpose of determining said round trip time in the wireless node to be positioned: providing, in said wireless node to be positioned, a time-stamping software layer above the physical layer, in an OSI stack, and using the time-stamping software layer to assign and register timestamps to at least part of the inputs and outputs of data frames received and to be sent by said wireless node to be positioned; processing, by means of a link software layer of said OSI stack of the wireless node to be positioned, the data frames received and to be sent by the latter; and providing a binding software layer, above said link software layer, and using the binding software layer to: access the timestamps registered by means of said time-stamping software layer, access the data frames to be sent, prior to their passage through the link software layer, and the data frames received, once processed by the link software layer, and bind the corresponding timestamps with at least the request data frame to be sent in stage a) and the response data frame received in stage b).

* * * * *